United States Patent [19]
Kennedy

[11] 3,893,647
[45] July 8, 1975

[54] CYCLE FRAME CLAMP

[75] Inventor: James D. Kennedy, Streamwood, Ill.

[73] Assignee: Beatrice Foods Company, Elgin, Ill.

[22] Filed: June 6, 1973

[21] Appl. No.: 367,416

[52] U.S. Cl. .......... 248/68 R; 24/73 PB; 24/81 BA; 24/81 CC; 248/74 PB; 248/231
[51] Int. Cl.² .......................................... F16L 3/00
[58] Field of Search.. 248/68 R, 74 PB, 231, 226 R, 248/226 C, 74 B; 24/81 BA, 81 CC, 24/73 PS; 73 AP, 73 PB, 243 AC, 24/248 SL, 252LH, 255 C, 255 PH, 255 VA, 255 SL, 16 R, 16 PB; 224/30 R, 30 A, 41

[56] References Cited
UNITED STATES PATENTS

| ,025,098 | 4/1912 | Morey | 248/61 |
|---|---|---|---|
| ,110,568 | 9/1914 | Ogden | 248/61 |
| ,417,269 | 3/1947 | Robertson | 248/61 |
| ,489,119 | 11/1949 | Burns et al. | 248/68 R |
| ,088,702 | 5/1963 | Orenick et al. | 248/74 PB |
| 3,273,213 | 9/1966 | Zurkowski | 248/74 PB X |
| 3,341,651 | 9/1967 | Odegaard | 248/74 PB X |
| 3,421,187 | 1/1969 | Ryder | 248/74 PB X |
| 3,523,668 | 8/1970 | Logsdon | 248/74 PB X |
| 3,740,801 | 6/1973 | Sears et al. | 24/81 CC |
| 3,757,387 | 9/1973 | Bush et al. | 24/81 CC |
| 3,758,060 | 9/1973 | Schuplin | 248/74 PB |

FOREIGN PATENTS OR APPLICATIONS

| 1,207,065 | 2/1960 | France | 24/73 PB |
| 1,052,285 | 12/1966 | United Kingdom | 248/74 PB |

*Primary Examiner*—Roy D. Frazier
*Assistant Examiner*—Rodney H. Bonck
*Attorney, Agent, or Firm*—Hill, Gross, Simpson, Van Santen, Steadman, Chiara & Simpson

[57] ABSTRACT

A clamp of single piece, molded plastic construction for demountably mounting circumferentially about a tube member in a tubular cycle frame or the like. The clamp is adapted to position and hold a couple of brake cables, wires, or the like in circumferentially spaced relationship one to the other.

1 Claim, 5 Drawing Figures

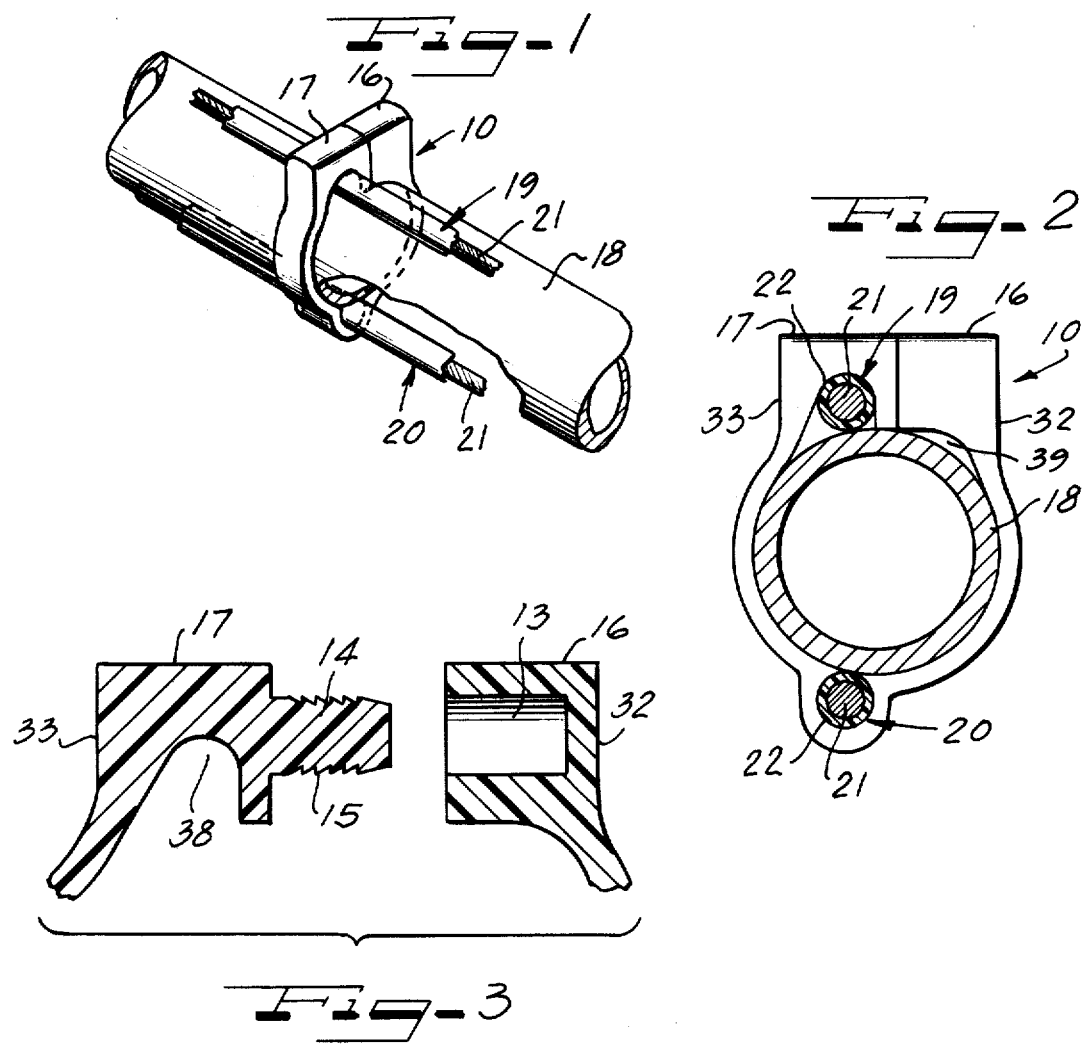
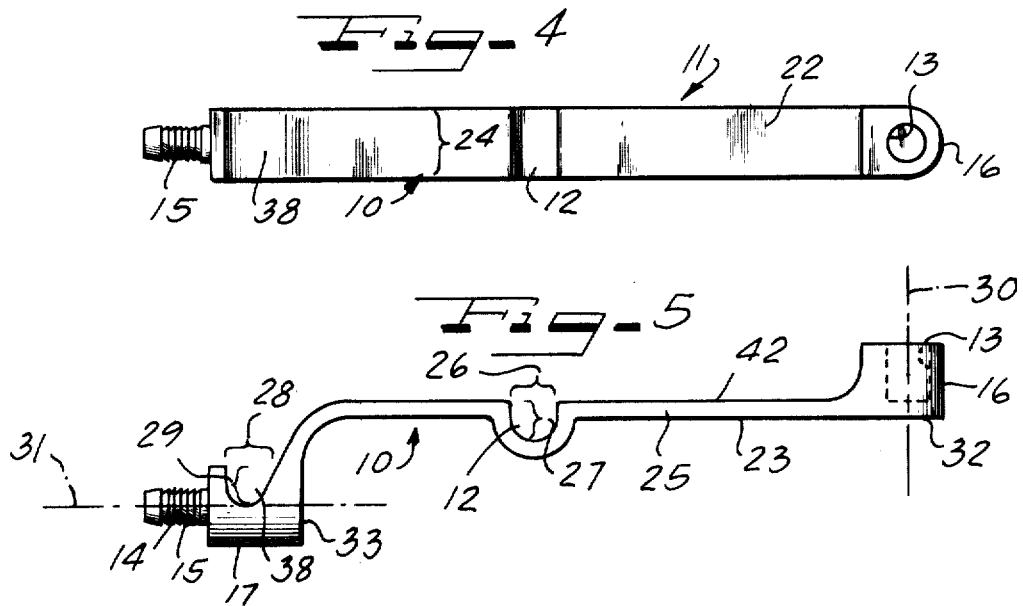

CYCLE FRAME CLAMP

BACKGROUND OF THE INVENTION

The recent proposed rules for bicycles published by the Department of Health, Education and Welfare, Food and Drug Administration, May 10, 1973, as Volume 38, Number 90, Part 3, Pages 12300-12306 of the Federal Register, provide that a bicycle shall have no unfinished sheared metal edges that are or may be exposed to hands and legs (see Section 191c.3(e)). As a consequence, the heretofore conventional clamps, which are characteristically formed from a strip of sheet metal or the like, used for securing bicycle brake cables, lighting wires, and the like to and along a bicycle frame thus are probably not acceptable because such prior art clamps have sheared metal edges. While such prior art clamps could be fabricated with rolled, or otherwise blunted edge portions, such so modified clamps are objectionable from a cost standpoint.

Accordingly, to comply with these proposed rules, a clamp formed of plastic and having no sharp edge portions becomes an important possibility. While plastic clamps for circumferentially mounting about a bicycle frame have heretofore been known to the art, it is believed that no one has heretofore proposed or provided a simple, one-piece, self-locking clamp which can be formed in one piece during a single, conventional plastics molding operation, which has the capacity to support and fasten adjacent a tube member in a bicycle frame in circumferentially spaced relationship to one another, a pair of cable-like members, including brake cables, electric wires, or the like, longitudinally extending along the outside surface of such tube member, and which accomplishes such a clamping action without applying compression against side walls of either cable-like member.

BRIEF SUMMARY OF THE INVENTION

The present invention has as its primary object the provision of a self-locking plastic clamp having no sharp edge portions which overcomes the limitations and undesirable aspects of prior art plastic bicycle frame clamps and further which is adapted to support a pair of longitudinally extending, circumferentially spaced cable-like members in fixed, non-compressed, adjacent relationship along the outside of a bicycle frame member.

The plastic clamp of this invention is readily fabricated in a single molding operation using conventional and readily available materials, apparatus and process technology, and the product clamp has no sharp edges to injure hands or legs.

In addition, a plastic clamp of this invention having the features above indicated is adapted to be self-aligning at its opposed opposite ends when such ends are brought into engagement with one another with the clamp girdling a bicycle frame member.

Other and further objects, purposes, advantages, utilities, and features will be apparent to those skilled in the art from a reading of the present specification and drawings.

BRIEF DESCRIPTION OF THE DRAWINGS

In the drawings:

FIG. 1 is a perspective view of a clamp of this invention mounted about a bicycle frame and holding two brake cables, some parts thereof broken away;

FIG. 2 is a vertical sectional view transversely taken through the embodiment of FIG. 1;

FIG. 3 is an exploded view of the opposite end portions in section of the clamp of FIG. 1; wherein such opposite end portions thereof are in a spatial configuration adapted for interconnecting said end portions with one another into interlocking relationship therebetween;

FIG. 4 is a top plan view of the clamp of FIG. 1 in an unassembled, open, flattened configuration; and FIG. 5 is a side elevational view of the clamp configuration shown in FIG. 4.

DETAILED DESCRIPTION

Referring to the Figures, there is seen one embodiment of a one piece, self-locking cycle frame clamp of this invention which is herein designated in its entirety by the numeral 10. FIGS. 4 and 5 show clamp 10 in the open configuration preferably utilized in forming clamp 10 in a single plastics molding operation. FIGS. 1 and 2 show clamp 10 in a closed and mounted configuration circumferentially about a cycle frame member 18 holding a flexible brake cable assembly 19 and a flexible brake cable assembly 20. Each cable assembly 19 and 20 conventionally comprises a central shaft portion 21 journaled for axial, reciprocal movements within a sheath 22, as those skilled in the art will appreciate. The cable assemblies 19 and 20 longitudinally extend along frame member 10 in a conventional manner, as those skilled in the art will further appreciate, in circumferentially spaced relationship. Clamp 10 about frame member 18 holds cable assemblies 19 and 20 adjacent frame member 18 without exerting any substantial radial compressive force upon either one of such cable assemblies 19 or 20.

Clamp 10 is seen to include a centrally disposed, elongated mid-section 11 having a front face 23 and a back face 42. The facial width 24 of mid-section 11 is generally substantially greater than the thickness 25 thereof. Mid-section 11 is interrupted at a generally central location by having integrally, permanently formed therein a cross-sectionally U-shaped projection 12 extending transversely across said mid-section 11 outwardly from said front face 23 and inwardly from said back face 42. The inside width 26 and inside height 27 of projection 12 are each sized so that projection 12 can accomodate therewithin a single, prechosen one of cable-like members, such as cable assembly 19 or 20.

A first thickened portion 16 is integrally formed at one end of said mid section 11 and has a socket 13 defined therein.

A second thickened portion 17 integrally formed at the opposite end of the mid section 11 has defined permanently therein a cross-sectionally generally U-shaped channel 38 which extends transversally across said mid-section 11 outwardly from said front face 23 and inwardly from said back face 42. The inside width 28 and the inside height 29 of channel 38 are adapted to accommodate therewithin a single prechosen one of cable-like members, such as cable assembly 19 or 20. Channel 38 is in longitudinally spaced, parallel relationship to U-shaped projection 12.

An integrally formed prong 14 projecting from said second thickened portion 17. Prong 14 is adapted to make mating engagement with the socket 13. Prong 14 has serrated outer side wall portions 15 which are adapted to make yielding, biased engagement with inside wall portions of the socket 13, thereby adapting the prong 14 to interlock with said socket 13 when so engaged therewith.

In clamp 10, and as shown in the Figures, preferably the axis 30 of socket 13 is generally normally inclined relative to mid-section 11, and socket 13 is generally upstanding relative to back face 42. Also in clamp 10, and as shown in the Figures, preferably the axis 31 of prong 14 is generally normally inclined relative to said mid section 11, and said prong 14 generally upstands relative to said back face 42.

Further in clamp 10, and as shown in the Figures, preferably behind said socket 13 and behind said prong 14, and integrally formed one in each of said first and second thickened portions 16 and 17, respectively, shoulders 32 and 33, respectively, are provided. Each shoulder 32 and 33 is adapted to provide a base against which pressure may be manually applied to engage socket 13 with prong 14.

Thus, when the mid section 11 is bent, as around a frame member 18, socket 13 is adjacent prong 14. The inside diameter of the socket 13 is approximately equal to the outside diameter of the preferably circumferentially serrated prong 14. Prong 14 is inserted into the socket 13 using pressure, manual or the like, applied against the shoulders 32 and 33 associated with the opposed ends, respectively, of the socket 13 and of the prong 14.

The circumferential spacing between cable assemblies 19 and 20 is maintained integrally formed in the assembled clamp 10 on frame member 18 by projection 12 and channel 38.

The length of the clamp 10 is preferably chosen so that, when the clamp 10 is in a mounted configuration about frame 18, there is a minimum of play between clamp 10 and frame 18.

Clamp 10 is conveniently formed in a single molding operation of a resilient plastic. Any convenient plastic may be used, such as polyolefin, a polyamide, a polyester, polyvinyl chloride, or the like, as those skilled in the art will readily appreciate.

Preferably in a clamp 10, the inside face 42 adjacent thickened portion 16 is so shaped that when the clamp 10 is in a mounted configuration about a cycle frame member 18, a gap 39 exists between inside face 42 and the outside wall of the frame member 18. This gap 39 functions to provide flexibility in assembly and mounting clamp 10 about the cycle frame member 18.

Other and further embodiments and variations of the present invention will become apparent to those skilled in the art from a reading of the present specification taken together with the drawings and no undue limitations are to be inferred or implied from the present disclosure.

I claim:

1. A one-piece, self-locking clamp of resilient, flexible plastic, said clamp being adapted to extend circumferentially about a cycle frame member and being further adapted to hold a pair of cable-like members which longitudinally extend along a bicycle frame member in circumferentially spaced relationship without exerting any substantial radial compressive force upon either one of such cable-like members, said clamp comprising: a centrally disposed, elongated mid-section having a front face and a back face and whose facial width is generally substantially greater than the thickness thereof, said mid-section being interrupted at a generally central location by having integrally, permanently formed therein a cross-sectionally U-shaped projection extending transversely across said mid-section outwardly from said front face and inwardly from said back face whose inside width and inside height are adapted to accommodate therewithin a single, prechosen one of said cable-like members, a first thickened portion integrally formed at one end of said mid-section having a socket defined therein, a second thickened portion integrally formed at the opposite end of said mid-section having defined permanently therein a cross-sectionally generally U-shaped channel which extends transversely across said mid-section outwardly from said front face and inwardly from said back face and whose inside width and inside height are adapted to accommodate therewithin a single prechosen one of said cable-like members, said channel being in longitudinally spaced, parallel relationship to said U-shaped projection, an integrally formed prong projecting from said second thickened portion and adapted to make mating engagement with said socket, said prong having serrated outer side wall portions, which serrated portions are adapted to make yielding, biased engagement with inside wall portions of said socket, thereby adapting said prong to interlock with said socket when so engaged therewith, wherein the axis of said socket is generally normally inclined relative to said mid-section and said socket generally upstands relative to said back face in the region of said first thickened portion when said clamp is assembled, wherein the axis of said prong is generally normally inclined relative to said mid-section and said prong generally upstands relative to said back face in the region of said second thickened portion when said clamp is assembled, and wherein behind said socket and behind said prong, and integrally formed one in each of said first and second thickened portions, respectively, shoulders are provided each of which is adapted as a base against which pressure may be manually applied to engage said socket with said prong.

* * * * *